(12) United States Patent  
Bahr

(10) Patent No.: US 12,101,644 B1
(45) Date of Patent: *Sep. 24, 2024

(54) MULTIPLE ACCESS POINT BACKHAUL

(71) Applicant: Cable Television Laboratories, Inc., Louisville, CO (US)

(72) Inventor: John C. Bahr, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 161 days.

This patent is subject to a terminal disclaimer.

(21) Appl. No.: 17/141,481

(22) Filed: Jan. 5, 2021

Related U.S. Application Data

(63) Continuation of application No. 16/042,634, filed on Jul. 23, 2018, now Pat. No. 10,887,776.

(60) Provisional application No. 62/553,248, filed on Sep. 1, 2017, provisional application No. 62/535,382, filed on Jul. 21, 2017, provisional application No. 62/535,378, filed on Jul. 21, 2017, provisional application No. 62/535,372, filed on Jul. 21, 2017.

(51) Int. Cl.
| | | |
|---|---|---|
| *H04L 12/28* | (2006.01) | |
| *H04W 16/18* | (2009.01) | |
| *H04W 16/26* | (2009.01) | |
| *H04W 88/08* | (2009.01) | |

(52) U.S. Cl.
CPC ......... *H04W 16/26* (2013.01); *H04L 12/2838* (2013.01); *H04W 16/18* (2013.01); *H04W 88/08* (2013.01); *H04L 2012/2841* (2013.01)

(58) Field of Classification Search
CPC ..... H04W 16/26; H04W 16/18; H04W 88/08; H04L 12/2838; H04L 2012/2841
See application file for complete search history.

(56) References Cited

U.S. PATENT DOCUMENTS

| | | | |
|---|---|---|---|
| 3,772,772 A | 11/1973 | Lehnert | |
| 4,941,207 A * | 7/1990 | Maeda ..................... | H04B 7/24 455/523 |
| 5,880,868 A | 3/1999 | Mahany | |
| 5,977,851 A * | 11/1999 | Stancil ..................... | H01P 3/12 333/248 |
| 5,994,984 A | 11/1999 | Stancil | |
| 6,144,292 A * | 11/2000 | Brown ..................... | H04B 3/56 370/479 |
| 6,463,090 B1 * | 10/2002 | Dorfman ................. | H01Q 1/007 343/835 |
| 6,590,884 B1 | 7/2003 | Panasik | |
| 6,692,349 B1 * | 2/2004 | Brinkerhoff .............. | F24F 7/00 236/51 |
| 6,801,753 B1 * | 10/2004 | Keong ..................... | H01Q 1/12 333/248 |
| 6,871,081 B1 * | 3/2005 | Llewellyn ........... | H04W 88/085 455/426.2 |
| 6,980,768 B2 | 12/2005 | Arend | |
| 2003/0022616 A1 * | 1/2003 | Stiehl ..................... | B60H 1/249 454/162 |

(Continued)

*Primary Examiner* — Stephen M D Agosta
(74) *Attorney, Agent, or Firm* — PdZ Patent Law, PLLC

(57) ABSTRACT

Facilitating backhaul between multiples access points (APs) using ducts or other bounded passageways within a building, dwelling, etc. is contemplated. The backhaul may be utilized to facilitate exchange of data obtained by the APs through fronthaul with one or more clients. The data exchanged between the APs through backhaul may be referred to as ducthauling.

15 Claims, 11 Drawing Sheets

(56) References Cited

U.S. PATENT DOCUMENTS

| | | | |
|---|---|---|---|
| 2003/0176164 A1* | 9/2003 | Hefetz | H04B 1/3838 455/3.06 |
| 2004/0067731 A1* | 4/2004 | Brinkerhoff | F24F 13/06 454/325 |
| 2005/0030234 A1* | 2/2005 | Lauhoff | H01Q 1/3283 343/713 |
| 2007/0063914 A1* | 3/2007 | Becker | H01P 5/18 343/840 |
| 2007/0075075 A1* | 4/2007 | Jaeger | H01Q 1/42 220/1.5 |
| 2007/0298706 A1* | 12/2007 | Hudon | F24F 11/52 454/256 |
| 2008/0144562 A1 | 6/2008 | Draper | |
| 2008/0198824 A1 | 8/2008 | Wu | |
| 2009/0174614 A1* | 7/2009 | Stancil | H01Q 21/28 343/702 |
| 2009/0195461 A1* | 8/2009 | Hirt | H01Q 1/42 343/702 |
| 2010/0033390 A1 | 2/2010 | Alamouti | |
| 2011/0019583 A1 | 1/2011 | Zelenov | |
| 2013/0034196 A1* | 2/2013 | Vann | H04B 7/002 375/350 |
| 2013/0088397 A1* | 4/2013 | Mo | H01Q 1/44 343/702 |
| 2013/0128936 A1* | 5/2013 | Kennard | H04B 7/0837 375/222 |
| 2013/0202301 A1 | 8/2013 | Ago | |
| 2014/0218258 A1* | 8/2014 | Walker | H01Q 1/007 343/848 |
| 2014/0222216 A1* | 8/2014 | Chen | F24F 11/74 700/276 |
| 2015/0214633 A1 | 7/2015 | Pan | |
| 2016/0043473 A1* | 2/2016 | Walker | H01Q 1/38 29/601 |
| 2016/0050569 A1 | 2/2016 | Olgaard | |
| 2016/0269097 A1 | 9/2016 | Islam | |
| 2017/0179597 A1* | 6/2017 | Parekh | H01Q 19/132 |
| 2017/0256864 A1* | 9/2017 | Jensen | H01P 1/17 |
| 2018/0077583 A1 | 3/2018 | Schwengler | |
| 2019/0049143 A1* | 2/2019 | Myers | F24F 13/20 |

\* cited by examiner

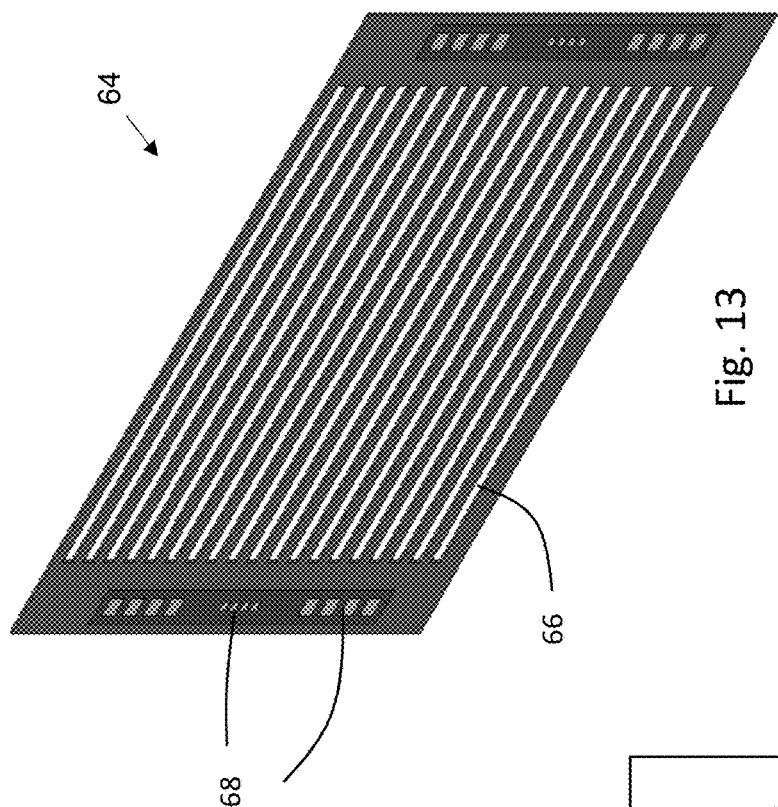
Fig. 13
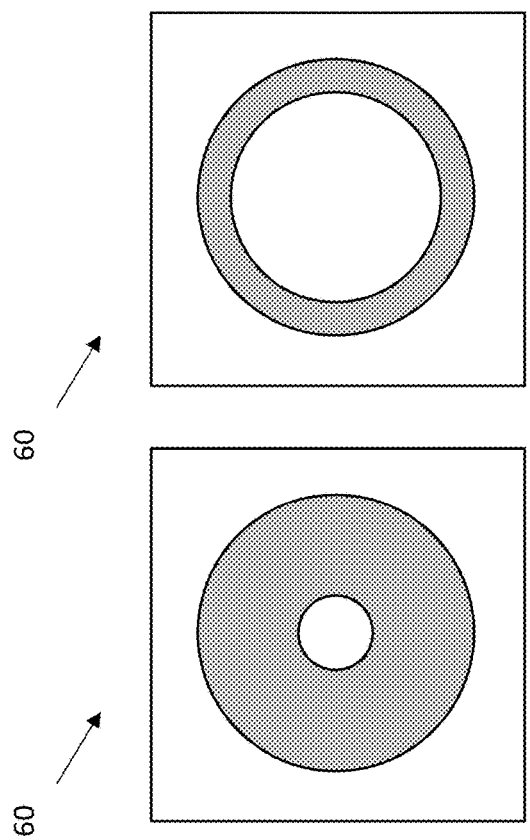
Fig. 12
Fig. 11

MULTIPLE ACCESS POINT BACKHAUL

CROSS-REFERENCE TO RELATED APPLICATIONS

This application is a continuation of U.S. application Ser. No. 16/042,634, now U.S. Pat. No. 10,887,776, which in turn claims the benefit of U.S. Provisional Patent Application Nos. 62/535,372, 62/535,382, 62/535,378 and 62/553,248 filed Jul. 21, 2017, the disclosures of which are incorporated in their entireties by reference herein.

TECHNICAL FIELD

The present invention relates to facilitating backhaul communications between access points (APs), including facilitating backhaul communications between APs operating at higher frequencies, such as in the millimeter wavelength.

BACKGROUND

As homes sizes grow and the number of client devices in a home network are increasing exponentially, there is a need for not only consistent performance in terms of throughput and connectivity but also Wi-Fi coverage throughout the home. Consumers often need more than one Wi-Fi Access Point (AP) in the home network to provide that coverage. Many houses do not have existing wires that can be used to network multiple APs together, and one easy and efficient way to provide whole home Wi-Fi coverage is by using Wi-Fi itself to connect together the APs in the home, such as with mesh APs (MAPs), repeaters or extenders. APs may utilize attendant protocols to facilitate establishing communications between the APs for purposes of managing, optimizing and otherwise controlling the related signaling paths.

The signal paths between multiple APs may be characterized as backhaul and differentiated from signaling paths between individual APs and client devices, which may be characterized as fronthaul. Depending on the spatial relationship within a home or other environment, the APs may experience difficulties in wirelessly facilitating backhaul communications due to path losses, attenuation and other signal degradations associated with signaling traveling through walls and other obstructions within a home or other environment. The degradations may become particularly problematic at higher frequencies due to higher frequencies signaling lacking capabilities for penetrating walls and other obstructions. One non-limiting aspect of the present invention contemplates facilitating backhaul communications between APs, including facilitating backhaul communications between APs operating at higher frequencies, such as in the millimeter wavelength, above 60 GHz, etc.

BRIEF DESCRIPTION OF THE DRAWINGS

FIGS. 11-12 schematically illustrates electro-mechanical apertures in accordance with one non-limiting aspect of the present invention.

FIG. 13 illustrates a vent in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
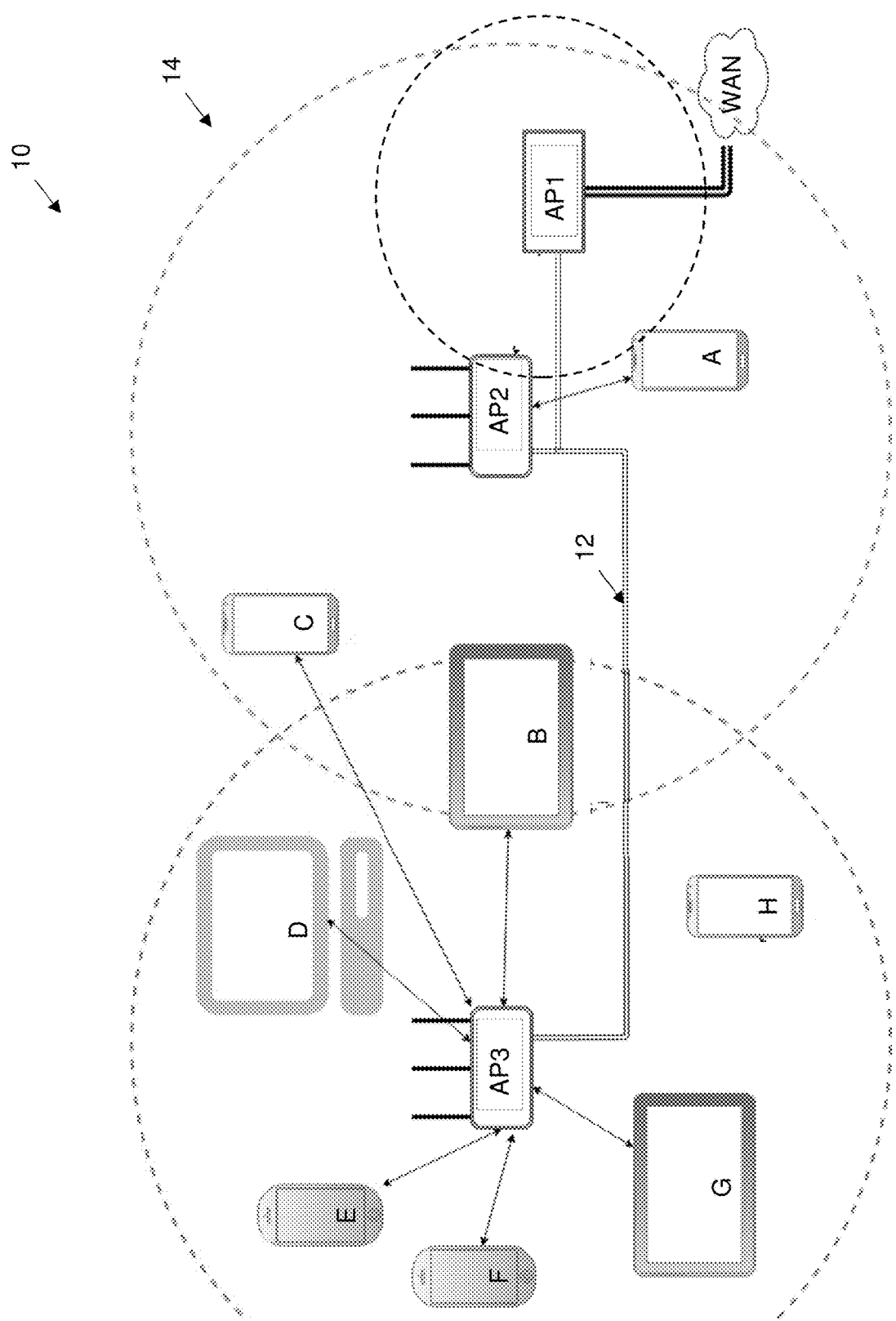
FIG. 1 illustrates a system having multiple access point (AP) backhaul in accordance with one non-limiting aspect of the present invention.

FIG. 1 illustrates a system 10 having multiple access point (AP) backhaul in accordance with one non-limiting aspect of the present invention. The system 10 may include a plurality of APs having capabilities sufficient to facilitate interfacing wireless signals with a plurality of clients. The clients, which may optionally be referred to as stations (STAs), and the APs connected or associated therewith (solid lines) may operate according to any suitable communication protocol and are predominately described for exemplary, non-limiting purposes as providing Wi-Fi signaling in accordance with Institute of Electrical and Electronics Engineers (IEEE) 802.11: Telecommunications and information exchange between systems—Local and metropolitan area networks—Specific requirements-Part 11: Wireless LAN Medium Access Control (MAC) and Physical Layer (PHY) Specifications, 2012, and/or other specifications within the IEEE 802.11 series, including but not necessary limited to 802.11ad, 802.11k, 802.11u and 802.11v, the disclosures of which are hereby incorporated in their entireties by reference herein. The exemplary description of the present invention may be utilized with non-Wi-Fi environments and is described with respect to Wi-Fi for non-limiting purposes to demonstrate the capability of the present invention to facilitate backhaul communications within a wireless networking environment where multiple APs may be utilized to provide network-based or network-centric decisions associated with clients switching from one AP to another.

The system 10 is shown to include three APs operating to facilitate interfacing the clients with an external or wide area network (WAN), such as that associated with an Internet service provider (ISP) or other multiple system operator (MSO). A first AP (AP1) is shown to also be acting as a gateway (GW) with a second AP (AP2) and a third AP (AP3) are shown to be connected downstream therefrom. All data or other information/messaging intend to be interface with the clients, collectively referred to as client data, and intended for exchange over the WAN may be required to pass through the AP1 such that AP1 may be considered as the last link or hop between the WAN and the plurality of APs, i.e., any data originating with the clients for transmission to the WAN and any data originating on the WAN for transmission to the clients may pass through AP1. The wireless signaling of the APs may be utilized to facilitate exchanging client data with the clients through fronthaul communications whereupon the exchanged client data may be communicated over a first local area network (LAN) 12 established between the APs, which may be referred to as a backhaul network. The wireless signaling associated with the APs (shown with dashed circles centered at AP1, AP2 and AP3) may form a second local area network 14 or fronthaul network over which the clients communicate with the APs such that the system 10 includes two LANs 12, 14—one 14 for communication between the APs and the clients and one 12 for communication between the APs.

The second LAN 14, i.e., the Wi-Fi or other network 14 for facilitating fronthaul communications between the APs and the clients, may be entirely composed of wireless signaling associated with the APs. One non-limiting aspect of the present invention contemplates the system 10 operating in a home or other location where it may be desirable to provide a singular interface for subscribers to easily locate their wireless network (the second LAN 14) without having to distinguish the AP facilitating communication with the client/device that subscriber is using, such as in the manner described in U.S. patent application Ser. No. 15/878,337, entitled Client Steering, the disclosure of which is hereby incorporated by reference in its entirety herein. The APs may enable the singular interface concept through use of the same service set ID (SSID), i.e., each AP may broadcast identical SSIDs and facilitate wireless signaling optionally over multiple bands and/or channels. The APs may be collectively part of the same extended service set (ESS) and utilize different basic service set IDs (BSSIDs) for each basic service set (BSS), e.g., each AP in the illustrated example, to enable the clients to associate with the second LAN 14 without the subscribers having to distinguish one AP from another. The first LAN 12 may be distinguished from the second LAN 14 at least in so far as the clients being unable to connect with or associate with the first LAN 12 or otherwise access signaling communicated thereover.

Figure 2:
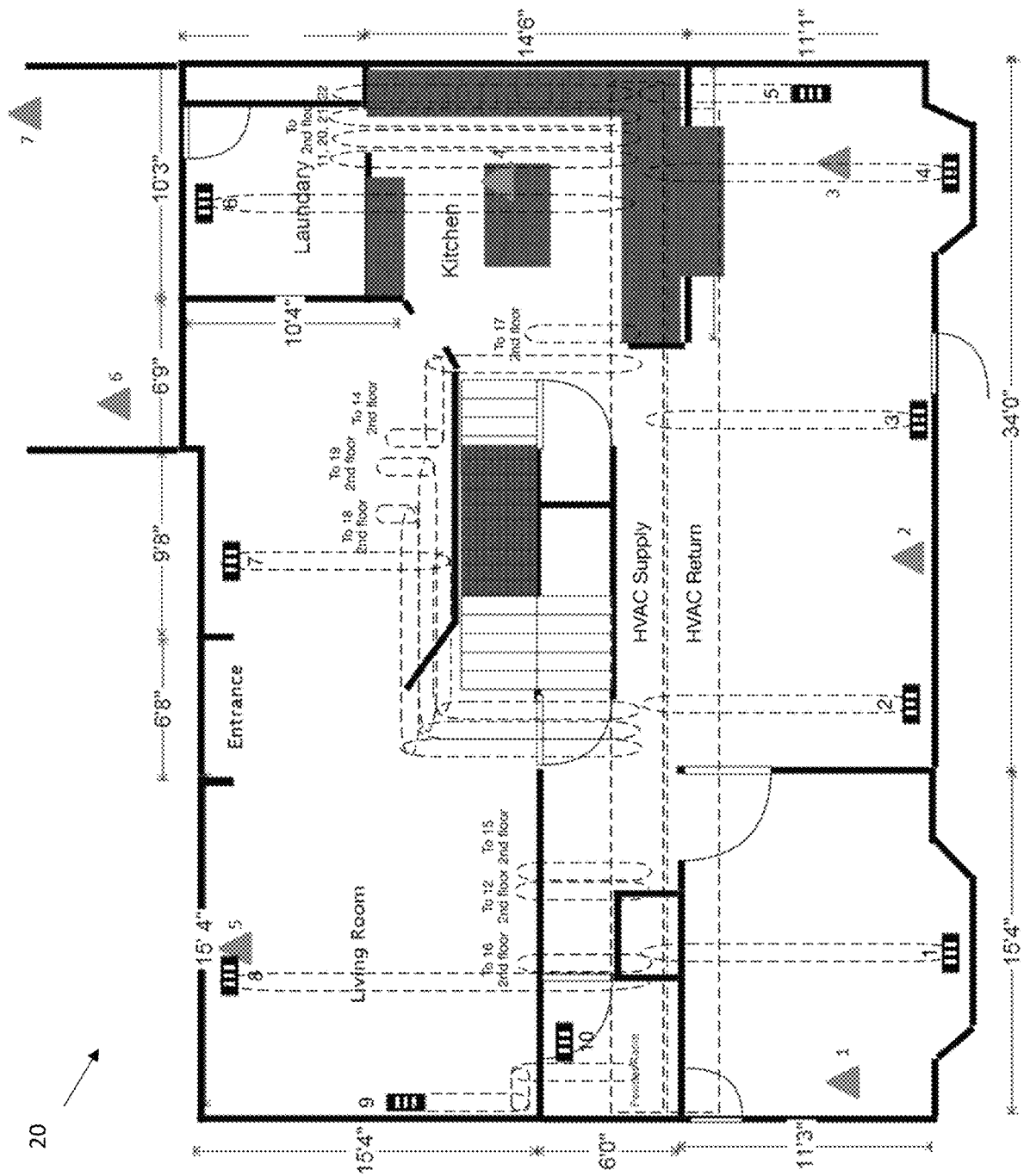
FIGS. 2-3 respectively illustrate first and second floors of a building having ducthauling in accordance with one non-limiting aspect of the present invention.
Figure 3:
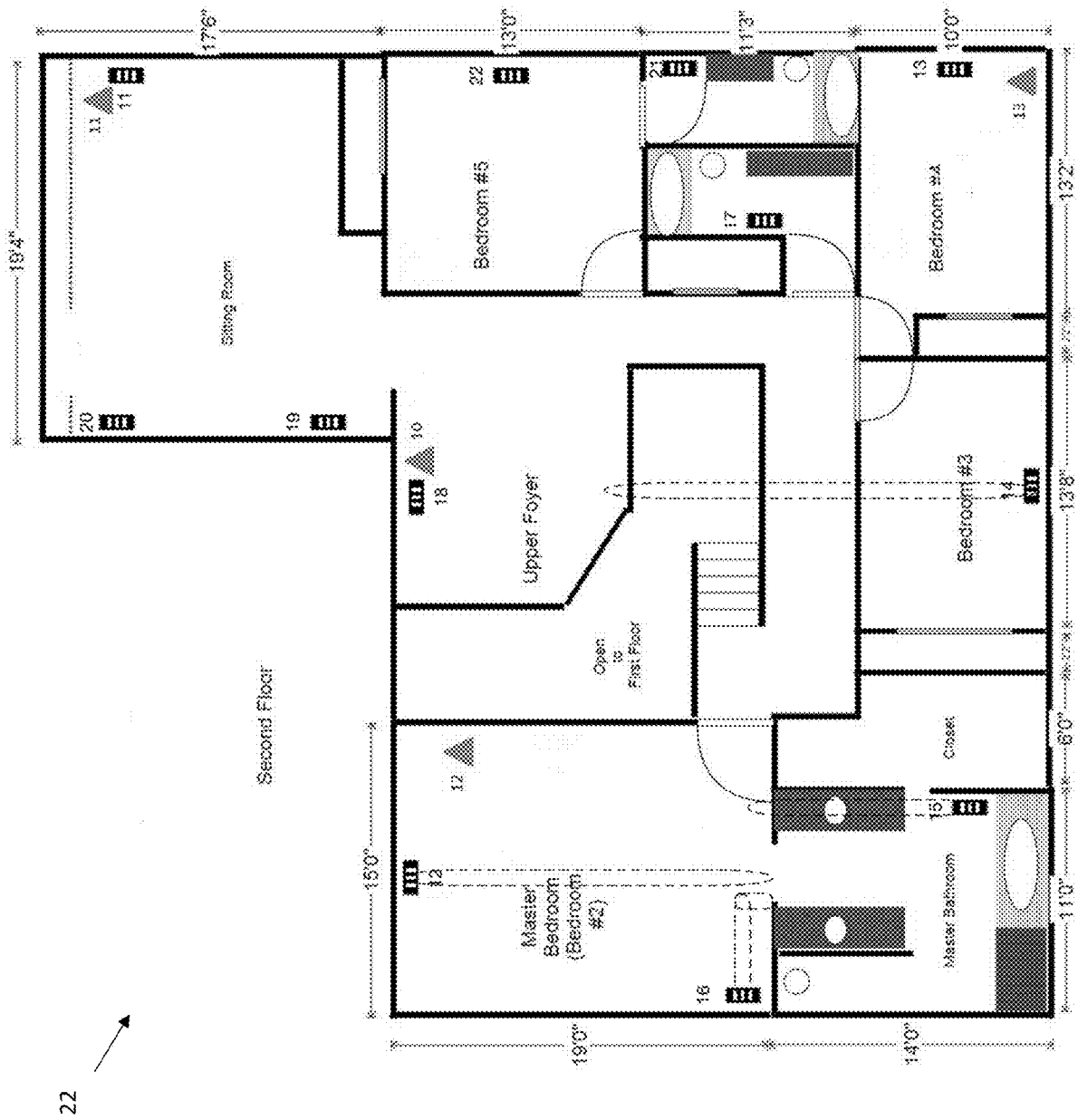

FIGS. 2-3 respectively illustrate first and second floors 20, 22 of a building having the communication system 10 in accordance with one non-limiting aspect of the present invention. The building is illustrated for exemplary purposes with respect to being a home or other dwelling where a ventilation system includes ducting, conduits or passageways to facilitate delivering air as part of a heating, ventilation, and air conditioning (HVAC) system. The ducting is illustrated with dashed lines to generally depict a distribution system for conveying a positive air flow of an HVAC supply, which may be in the basement (not shown), and a negative airflow of an HVAC return. One non-limiting aspect of the present invention contemplates facilitating backhaul communications between the plurality of APs using the ducting associated with the ventilation system. The ducting or individual ducts may be comprised of metallic material or other material having sufficient insulation or shielding properties to facilitate bounding communication of wireless signaling therein. The use of such ducting may be beneficial in minimizing signaling loss in comparison to the same signaling being communicated in free space. The exemplary ventilation system presumes both of the HVAC supply and return having ducting capable of bounding the wireless signaling communicated therethrough. The present invention is equally adaptable to use in ventilation systems where some of the ducting may not be sheet-metal or other material sufficient for bounding wireless signals, e.g., such as in the event the HVAC return utilizes wood studs to form its ducting.

The use of the ventilation system to facilitate backhaul communications is believed to be particularly beneficial at higher frequencies due to higher frequencies lacking capabilities sufficient to facilitate AP-to-AP communications through infrastructures within the building. Walls, stairwells, tiling, wiring, insulation and other materials used in constructing the infrastructure for homes, dwellings, apartments, office buildings, etc. can interfere, attenuate, distort or otherwise disrupt wireless signaling to an extent essentially preventing wireless/Wi-Fi signaling from adequately through the infrastructure in a manner sufficient to properly support AP-to-AP, backhaul communications, particularly for higher frequencies associated with millimeter-wavelength communications (mmWave). The background-noted mesh APs (MAPs), repeaters and extenders, absent the ducting-based communications contemplated herein or unless operating at frequencies lower than those associated with mmWave, would be unable to reliably establish mesh networks in the illustrated building due to interferences of the infrastructure preventing sufficient backhaul communications. The backhaul communications described herein generally relate to utilizing the ventilation system to facilitate backhaul between multiple APs, which may be accomplished utilizing mmWave communications between APs in what may be characterized as ducthauling.

The ducthauling contemplated herein utilizes ducts as guiding structures that confine a transmitted mmWave signals to a given cross sectional area in a manner sufficient to conserve most of the transmitted power. Such signaling, i.e., signaling transmitted in the contemplated manner through ducting, can become depolarized, making careful alignment of an antenna within a duct unnecessary, and massive multi-path in the ducts can both be a benefit and a detriment: very high power transmission but with high phase shift. The ducting may operate as waveguides (rectangular, circular, triangular, flexible tubing, etc.) to produce low loss when compared to other types of transmission lines due to the signal propagating therein through the air space inside the waveguide where the loss is minimum. A rectangular, circular or shaped metal tube can start behaving as a waveguide when the cross-sectional dimension of the guide becomes comparable to a signal's operating wavelength. A 6" diameter air duct, for example, which is between 15 and 30 wavelengths at some of the mmWave frequencies contemplated by the present invention (e.g., 28 GHz, 60 GHz, 73 GHz and above), provides such large dimensions (compared to the wavelength) that the ducts fail to act as transmission lines in the conventional sense but as a guiding structure that confines the transmitted signals to a given cross sectional area. Using existing and often randomly configured ventilation ducts in a ventilation system as actual transmission lines, i.e., to physically conduct current therethrough, would be extremely difficult but using the ventilation ducts as the simple guiding structures for wireless signaling maybe quite practical in the manner contemplated herein.

Figure 4:
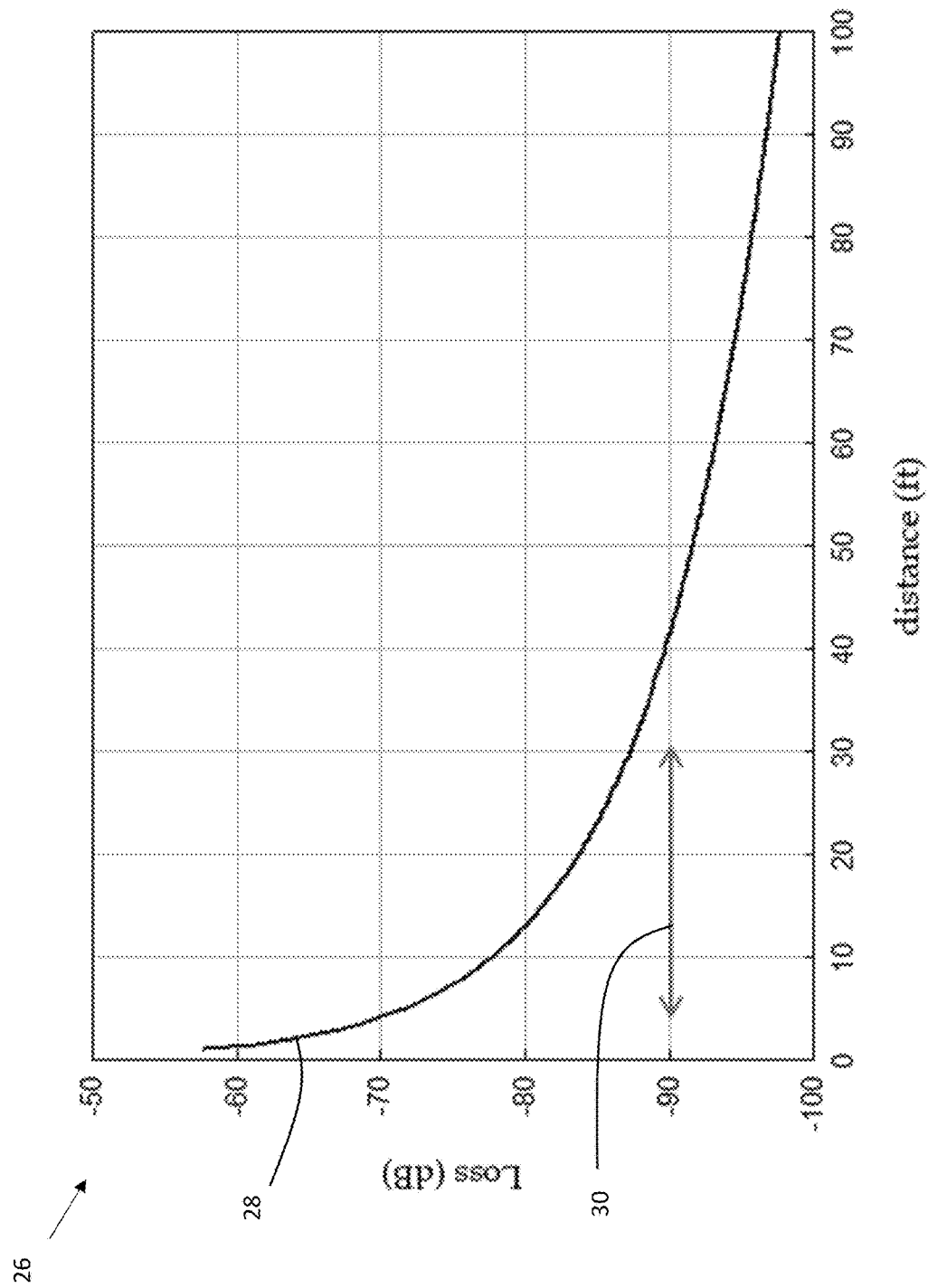
FIG. 4 illustrates a graph in accordance with one non-limiting aspect of the present invention.

Propagation loss for wireless signal, particularly for mmWave, could be called spreading out loss in so far as the loss relates predominately to the attendant signaling being unbound in free space such that it spreads out too much to be effective over even minimal distances. The contemplated ducthauling may be beneficial in that is significantly, if not totally, limits the spreading out loss due to the ventilation system and corresponding ducts perforating and spreading throughout a house to such an extent that commute communication through walls rather a structure is no longer necessary, effectively eliminating the penetration loss through walls and floors, i.e., the necessity to communicate through walls or floors may cease with the contemplated ducthauling. The spreading out loss can be related to a point source radiating out equally in all directions at 1 Watt of total power experiencing approximately a 15 µW per square inch drop in power density at 6 feet due to the original 1 Watt signal spreading across a surface area of a corresponding six-foot sphere. FIG. 4 illustrates a graph 26 of this rapid increase in loss (curve 28) for a 60 GHz operating frequency in comparison to a normal operating distance for some 60 GHz commercial products (straight-line 30) to demonstrate at just 40 ft there is 90 dB of loss, meaning the wireless signal is roughly a billion times weaker than the original transmission. The unbound, wireless signal didn't actually get smaller at 6 feet, rather a tiny fraction of the original signal is detected due to it spreading out. In the contemplated ducthauling, while the signals do bounce off the walls of the ducts, they cannot spread out beyond the cross-sectional area of the given geometry, which in turn essentially eliminates the spreading out loss. There may be some actual loss due to conduction currents induced on the metal walls of the ducts, but those losses appear to be negligible compared to conventional propagation loss of unbound wireless signals.

Figure 5:
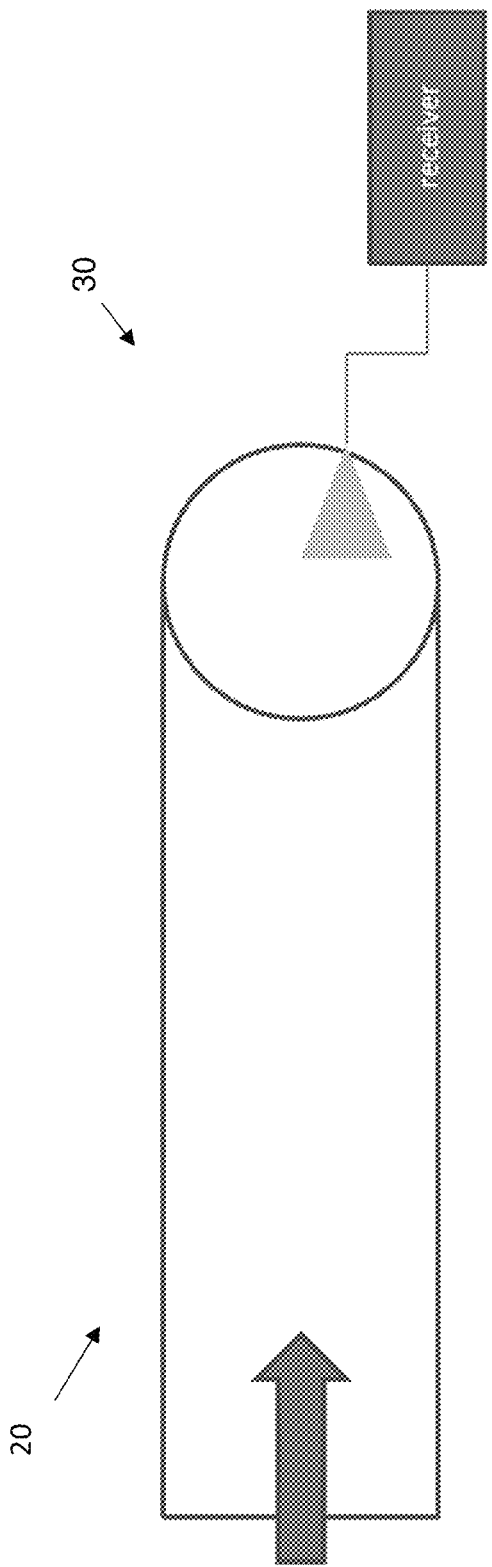
FIG. 5 illustrates a test environment in accordance with one non-limiting aspect of the present invention.

FIG. 5 illustrates a tested, bounded environment 30 where ducthauling was measured using two waveguide horn antennas to assess the signal loss across a 10 ft distance, verifying that the signal source was transmitting roughly 0dBm (1 mW) of total power. The multipath bouncing associated with the wireless signaling traveling through the duct essentially depolarizes the signal once the millimeter-wave signal enters the duct work. With two linear antennas being used him, at the receive end the measured channel power did not vary much as the antenna was rotated (despite that a linearly polarized signal was the source). While this does cause a theoretical 3 dB loss in signal (assuming only one polarization is received), it may be negligible compared to the gain achieved by confining the signals within the duct work. The depolarizing feature can be more of a benefit since it makes careful alignment of an antenna within a duct unnecessary. In one experiment at 73 GHZ, the received signal strength across 10 ft using the horn antennas was compared to the same distance through a 6" diameter metal duct. When measuring the absolute received power through the 6" duct it was found to be down by about 16 dB, which is not loss in the conventional sense. The ratio of the cross-section of the duct to the horn antenna's aperture was about 0.058 (~12 dB) such that the loss is more representative of how much of the total propagating signal the receiving antenna intercepts (ignoring multipath and polarization mismatch), i.e., it shows that very little signal loss actually occurred.

Figure 7:
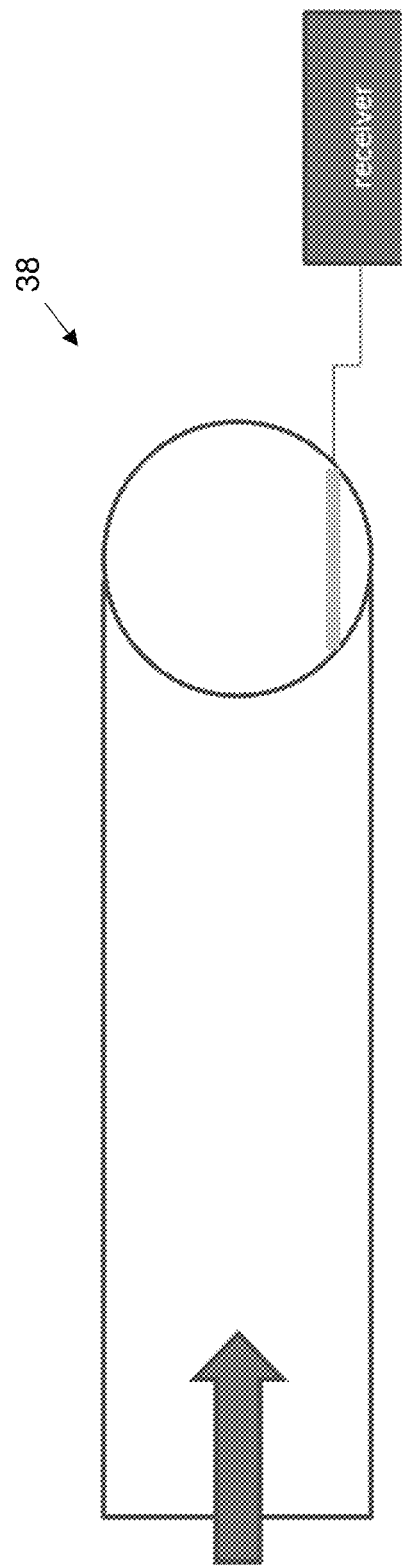
FIG. 7 illustrates a flat antenna in accordance with one non-limiting aspect of the present invention.
Figure 6:
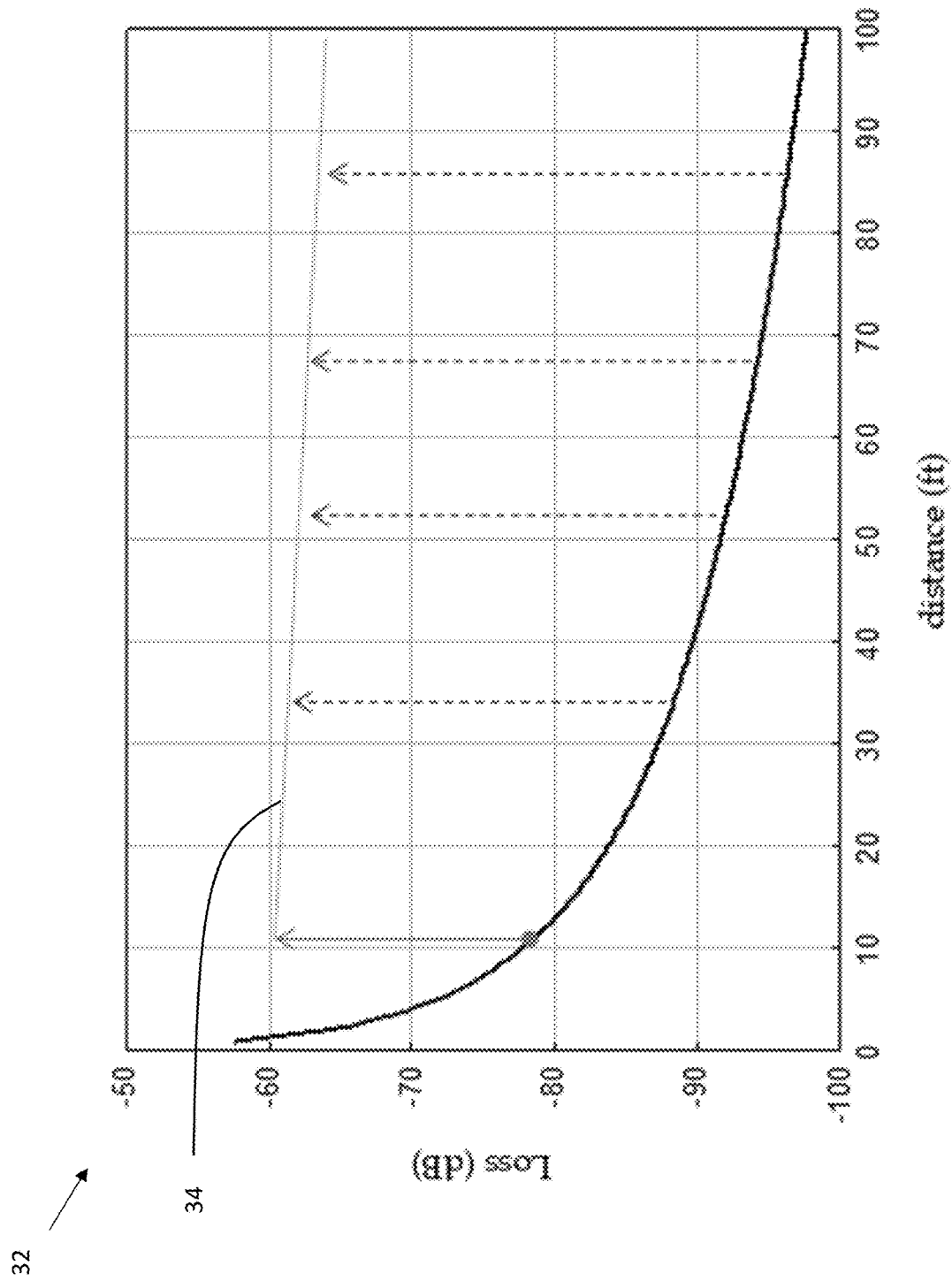
FIG. 6 illustrates a graph in accordance with one non-limiting aspect of the present invention.

FIG. 6 illustrates a graph 32 for relating the loss in the ducthauling test associated with FIG. 5 to the loss associated with the free space of FIG. 4. The results show an increase in signal strength over free space due to confinement by the ducts (beginning after about 10 ft) as there is very little actual loss as the signals propagates. A line 34 represents this increase as a reasonable estimate of a signal down a very long duct, which illustrates an initial signal increase of about 20 dB (100×) compared to free space. While this might not appear that impressive a change, the actual loss (once inside the duct) will increase very slowly compared to free-space transmission, i.e., the apparent improvement over free-space at 10 ft is just 20 dB but the improvement would grow to 30 dB (1,000×) or more as the length of the duct grows. In the tested environment of FIG. 5 and had the receiving antenna been large enough to cover the entire 6" face of the duct, the loss would have approached just a few dB even for 10's of feet. One non-limiting aspect the present invention contemplates optionally utilizing a flat antenna to increase the effective aperture while not blocking airflow by orienting the antenna properly. FIG. 7 illustrates an environment 38 for use of the flat antenna in accordance with one non-limiting aspect of the present invention to enable the receiver to intercept a portion of the signal related to its cross-sectional area, i.e., a planar antenna can be laid flat so as to not block airflow but the effective aperture can be increased as needed.

Figure 8:
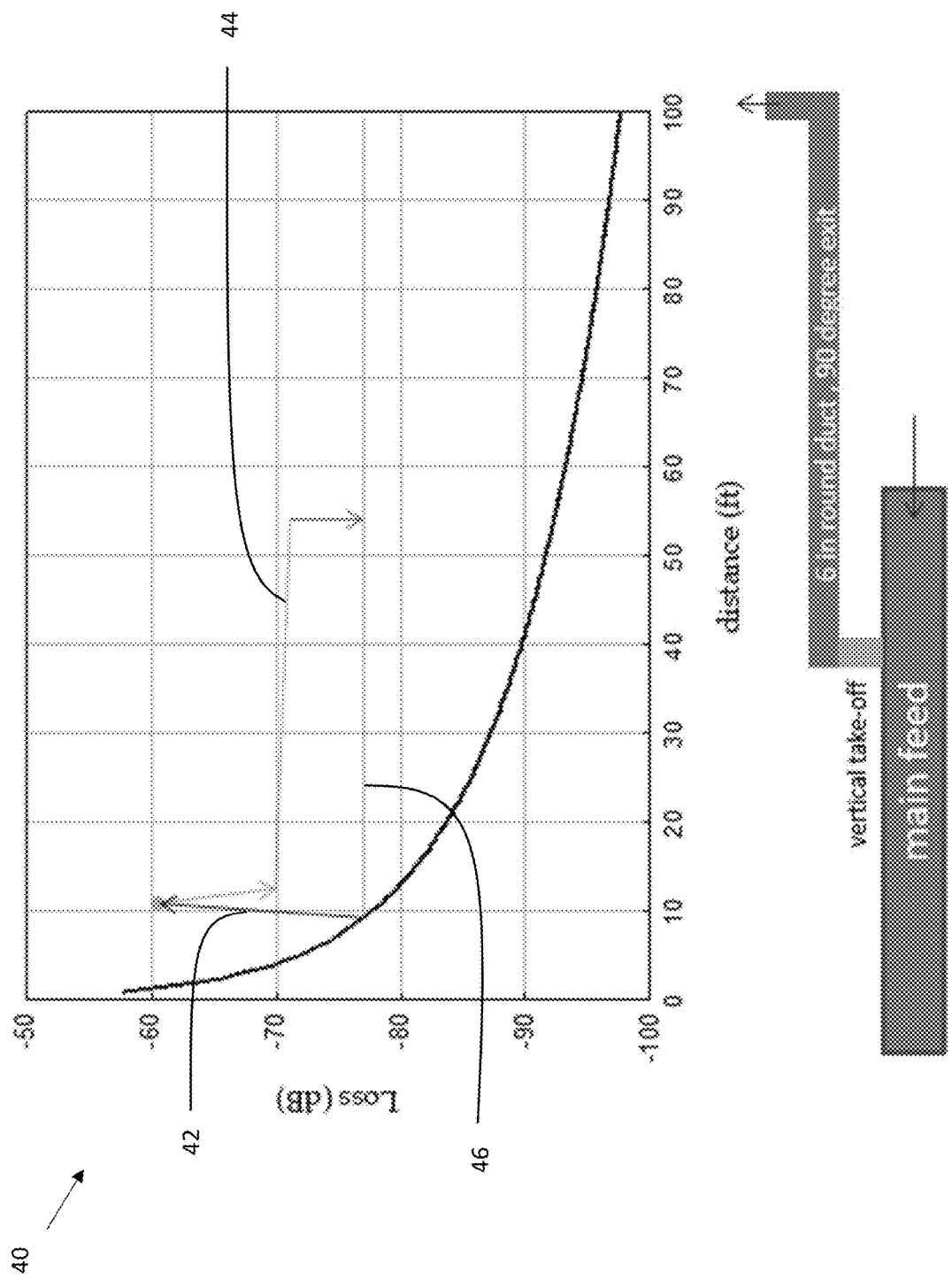
FIG. 8 is a graph in accordance with one non-limiting aspect of the present invention.

FIG. 8 is a graph 40 illustrating the ducted backhaul concept in accordance with one non-limiting aspect of the present invention. The graph 40 illustrates a signal 42 being launched down a large rectangular feed having a vertical take-off and about 10 ft of 6" round ducting. Starting from the same signal level as above, the roughly 10 dB of loss displayed at 10 ft represents the take-off allowing about 1/10 of the total signal to enter the 6" duct (the rest of the signal isn't lost as it would just keep propagating down the main feed). A dashed 44 illustrates of how the signal would actually get smaller as it travelled down a long length of 6" duct. A dotted line 46 marks off the allowable loss that conventionally radiated 60 GHz systems can handle, showing that much greater transmission distances are realistically possible in a ducted environment. A single-tone amplitude measurement was done as a comparison to the modulated measurements done at 73 GHZ (FIG. 5). One particular measurement using rigid ducts indicated passing through a straight 10 ft section resulted in about a 9 dB reduction in received signal (compared to an arbitrary reference of 3 ft of free space) yet passing through the same length with two 90° bends showed just a 6 dB reduction, which indicates the severe multipath environment can help received signal levels. Related testing of some flexible duct samples, assuming flex-ducts are made with a thin conductive outer layer, indicate at least at 28 GHz their use would still allow for backhaul operation, and that 28 GHz may be superior to 73 GHz.

The ducthauling contemplated by the present invention theorizes leveraging the signaling benefits described above to facilitate backhaul of wireless signaling between multiple access points within a home or other dwelling at frequencies otherwise unsuitable to facilitating non-ducting, wireless backhaul between the access points. One non-limiting aspect of the present invention contemplates an architecture whereby the APs may be positioned within a room and connected via a cable or other suitable bound medium to one or more antennas position within the ventilation system, which may be referred to as ducting antennas. While positioning the APs within the ventilation system with their antennas is contemplated, it is believed that dust, heat exposure and other factors within the ducting may adversely influence long-term operation of an AP and its attendant processors, componentry, etc., whereas an antenna using the wiring to connect with it may be less susceptible to similar influences. A connection medium between an AP and the associated antenna within the ventilation system may be hidden within a wall or other infrastructure of the room to cosmetically conceal its usage, which may enable the AP, e.g., a box or other structure housing the AP componentry, to be positioned within a room on a desk, cabinet etc. as modems, routers, gateways and other similar devices are typically arranged.

One non-limiting aspect of the present invention contemplates the APs including antennas operating independently of the ducthauling antennas. The APs may include separate sets of antennas for communicating with clients, such as one or more integrated antennas included as part of its structure that may be referred to as client antennas. While the present invention contemplates wirelessly interconnecting the ducthauling antennas with their AP, the bound communication medium may be used to for the interconnection to eliminate the need for additional wireless signaling therebetween and to provide a more reliable or less interfered with communication medium. The bound communication medium may also be beneficial in a retro-fit or legacy installation where the AP may lack sufficient antennary to independently support client communications and backhaul communications or the mmWave ducthauling contemplated herein. The independently operable antennas of the APs, i.e., the client antennas and the ducthauling antennas, regardless of their interconnection with the AP, may be beneficial in enabling the APs to facilitating mmWave and/or non-mm-Wave client communications and mmWave backhaul communications. The use of non-mmWave client communications may be particularly beneficial in environments where it may be undesirable to use mmWave for communicating with clients due to signaling considerations or an inability of some clients to support mmWave communications.

Once the APs are positioned within a room to facilitate the desired client communications, an installation process may occur to interconnect the AP with its ducting antenna. The ducting antennas may be positioned within an opening provided to the ventilation system, which may be performed by inserting the antenna through an existing ventilation system opening within the room or creating a new opening to the ventilation system. While connecting a singular AP to multiple ducthauling antennas positioned at different locations within the ventilation system is contemplated, the present invention is predominately described with respect to each AP being connected to one ducthauling antenna as the essentially lossless nature of the ducthauling communications noted above may make the use of additional ducthauling antennas superfluous. The ducthauling antennas can be mounted by inserting a cone, stand, surface mount or other type of antenna structure within an opening cut into one of the ducts, such as by removing a portion of a wall and a related duct and weaving the antenna and connector therethrough. This type of installation may be acceptable when constructing a room or building initially but it may be somewhat arduous to do so later at least in that adopters may be less inclined to undertake the related renovations necessary to install and then cosmetically conceal the installation.

Figure 10:
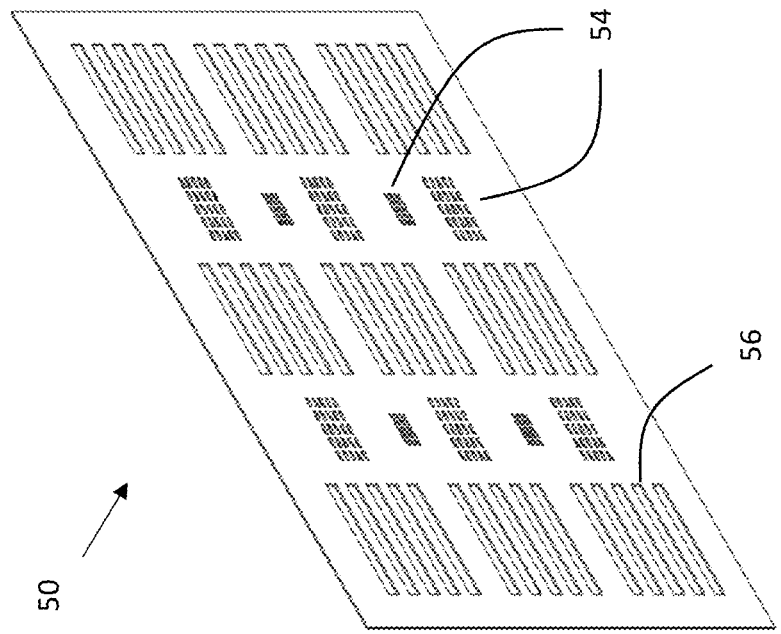
FIGS. 9-10 illustrates a vent in accordance with one non-limiting aspect of the present invention.
Figure 9:
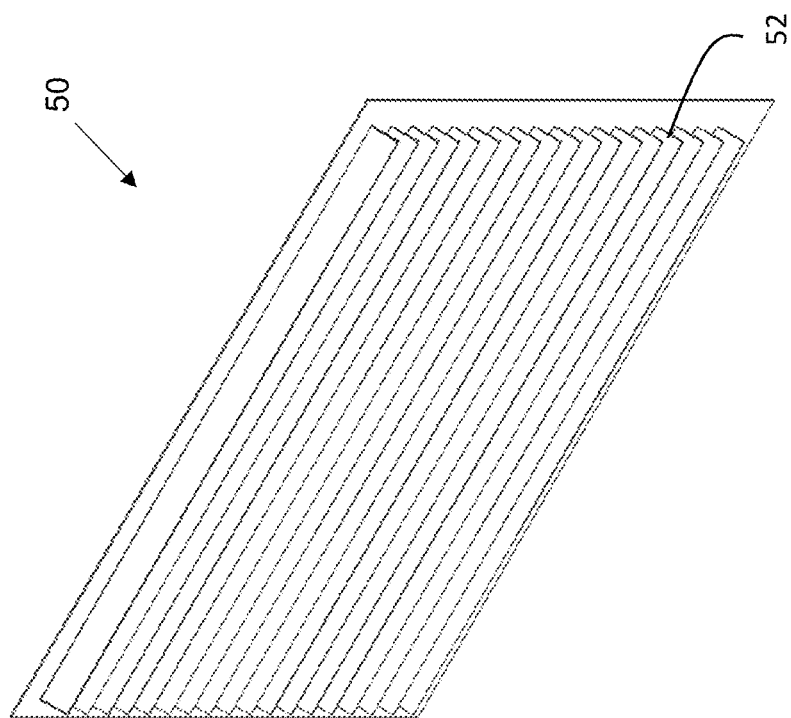

FIGS. 9-10 illustrate a vent 50 in accordance with one non-limiting aspect of the present invention. The vent 50 may be constructed as a grate, cover, flap or other structure sufficient for placement within a corresponding opening to the ventilation system. The ventilation system illustrated in FIGS. 2-3 includes a plurality of openings into each room for respective HVAC supply and return ducting whereby the corresponding openings may be suitable for occlusion with the vent. The ventilation system openings may be inlaid or otherwise framed within walls, flooring or ceilings to facilitate airflow through the HVAC supply and return systems such the vent may be utilized with those existing or pre-planned, infrastructural opening of the building. FIG. 9 illustrates a front side or room-facing side of the vent 50 being sufficiently sized for occluding an entirety of a corresponding opening to the ventilation system. The front side may include a plurality of slats, louvers or other suitable passageways 52 for ornamentally concealing the opening and/or directing airflow therethrough. FIG. 10 illustrates a backside or duct-facing side of the vent 50 including the ducting antenna as including a plurality of surface mounted type of antenna arrays 54 positioned relative to a plurality of apertures 56. The plurality of apertures 56 may provide may interconnect with the slates 52 to provide a corridor sufficient for facilitating the passage of airflow therethrough.

The vent 50 may be constructed of electromagnetically transparent material sufficient to facilitate a passage of wireless signaling therethrough and/or of electromagnetically sensitive material sufficient to occlude the passage of some or all wireless signaling therethrough. One non-limiting aspect of the present invention contemplates a desirability of isolating wireless signaling within a room, i.e., beyond the front side of the vent 50, from backhaul, wireless signaling occurring within the ducting, i.e., behind a backside of the vent 50. The isolation or separation of wireless signaling on either side of the vent 50 may be achieved by sizing and shaping the apertures 56 according to a frequency threshold associated with the desired isolation. The frequency threshold may be selected to correspond with a frequency between those used or expect to be used within the room and those used or expected to be used within the ducting such that the size and shape of apertures 56 may be correspondingly configured to block frequencies used within the room from penetrating or passing through the vent into the ventilation system, or vice versa, the apertures 56 may be correspondingly configured to block frequencies used within the ducting from penetrating or passing through the vent into the room. The capability to isolate wireless signaling entering and/or exiting the ducting may be beneficial in ameliorating interference, clutter or signaling degradations associated with unnecessarily mixing wireless signaling.

FIGS. 11-12 include schematically illustrates operation of an electro-mechanical aperture 60 suitable for use with the vent in accordance with one non-limiting aspect of the present invention. The electro-mechanical aperture 60 may be used in place of and/or in addition to the static or fixed apertures 56 illustrated in FIG. 10. The aperture 60 may be controllable through communications from the connected to AP or through communication from an gateway AP of the backhaul network 12 so as to dynamically adjust the size of apertures according to desired frequency isolation, i.e., to change the size of the aperture in proportion to the frequency desire to be blocked and/or past therethrough. FIG. 11 illustrates the aperture 60 providing a smaller opening in comparison to the illustration of FIG. 12, and the attendant electro-mechanical operation whereby a size of the aperture circularly increased/decreased. This is merely one exemplary illustration of an electro-mechanically aperture control as a function of instructions/messages communicated thereto from a corresponding AP as the present invention fully contemplates use of non-circular or other shaped/controllable apertures to facilitate the wireless isolation contemplated herein, practically to facilitate confining non-mmWave and/or mmWave to one or the other sides of the vent.

FIG. 13 illustrates a vent 64 in accordance with one non-limiting aspect of the present invention. FIG. 13 illustrates the vent 64 from a backside or duct-facing side where a front side (not shown) is contemplated to be similar to the front side illustrated in FIG. 9. The vent 64 may be differentiated from the vent 50 described above in that apertures 66 therethrough match or mirror the slats 52 such that the apertures 66 merely affect airflow without sufficiently obstructing wireless signaling in a manner necessary to act as a waveguide or other signal blocker. The vent 64 may be similar to that described above insofar as including a plurality of surface mounted type of ducting antennas arranged in arrayed patterns 68 relative to the apertures 66. Unlike the antenna arrays in FIG. 10, which may be positioned to actually cover a substantial portion of or an entirety of the opening, the antenna arrays 68 in FIG. 13 are alternatively illustrated as being positioned approximate lateral sides of the opening. Depending on the mmWave being utilized for backhauling and/or the capabilities of the ducting antennas 68, it may be unnecessary to include antenna arrays in the pattern illustrated in FIG. 10 such that of FIG. 13 may be utilized to provide antenna arrays in patterns less disruptive to airflow.

Figure 14:
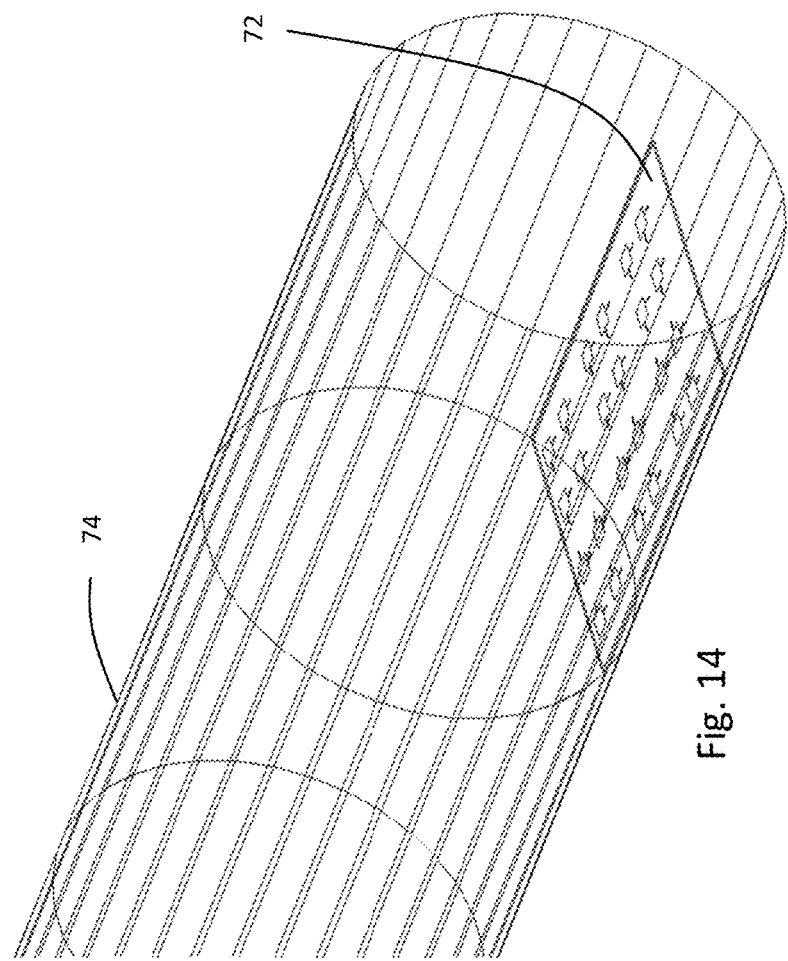
FIG. 14 illustrates an antenna in accordance with one non-limiting aspect of the present invention.

FIG. 14 illustrates a ducting antenna 70 positioned in a duct 72 in accordance with one non-limiting aspect of the present invention. The ducting antenna 70 may be configured to include a contiguous array of individual antennas (shown as squares) to be used in place of the vent-mounted antennas described above and/or in cooperation therewith, i.e., some APs may use the vent-mounted antennas and some APs may use the illustrated ducting antenna. The gateway AP may be installed approximate a furnace or other unit in a basement or other primary/originating source within the ventilation system by cutting a corresponding hole within attendant ducting and inserting the illustrated antenna therein. The need to cut into the ventilation system proximate the primary/originating source location may be necessary in the event the corresponding portion of the ventilation system lacks an opening coverable by one of the above-described vents and/or to position the antenna further away from the source. The positioning of the gateway AP proximate the primary/originating source location may be done in order to assure a last hop or last AP responsible for interfacing signals with the WAN is located within the ventilation system at a location reachable by all room-openings/events within the building. Each of the ducts within the building eventually connect in some manner to the furnace or other primary/originating source such that positioning of the gateway AP thereat may be beneficial in assuring communication with all APs.

Figure 15:
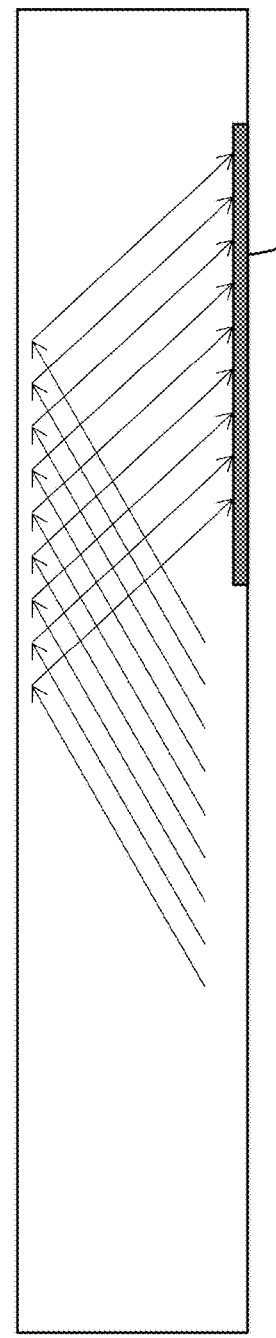
FIG. 15 illustrates a schematic cooperation of an antenna in accordance with one non-limiting aspect of the present invention.

The ducting antenna 72 is illustrated for exemplary purposes as being generally planar and positioned horizontally or parallel to the direction of airflow through the attendant duct. The positioning of the antenna in this manner may be contrasted to the vent-mounted antennas described above being positioned generally perpendicular to the direction of airflow. The horizontal or parallel positioning of the ducting antenna 72 may be beneficial in ameliorating airflow disruption through the ducting, which may be particularly beneficial in that obstructing airflow at the originating/source location may be detrimental to HVAC performance. A related installation may occur by mounting the ducting antennas on movable slats or louvers included within the ducting to control airflow such that the antennas mounted on the surface thereof move in unison with the slats or louvers, which optionally may be made out of material insufficient to affect passage of wireless signaling therethrough. FIG. 15 illustrates a schematic operation 78 of the ducting antenna shown in FIG. 14 in accordance with one non-limiting aspect of the present invention. The illustration demonstrates an optional configuration of the array of antennas 72 covering an area larger than the duct's cross-sectional area to ensure catching an entirety of the wireless signal as it bounces back and forth. Such a larger than cross-sectional area antenna may be beneficial in catching both polarizations and/or ensuring an entirety of the signal subjected to multipath and effective depolarization is captured for processing, which can provide improved error correction. Optionally, any one of the foregoing described antennas may further improve operation with the use of active beamforming to facilitate eliminating path(s) causing destructive interference can be eliminated, i.e., with an adaptive system, the best possible combination of amplitude/phase settings can be used to increase throughput.

Figure 16:
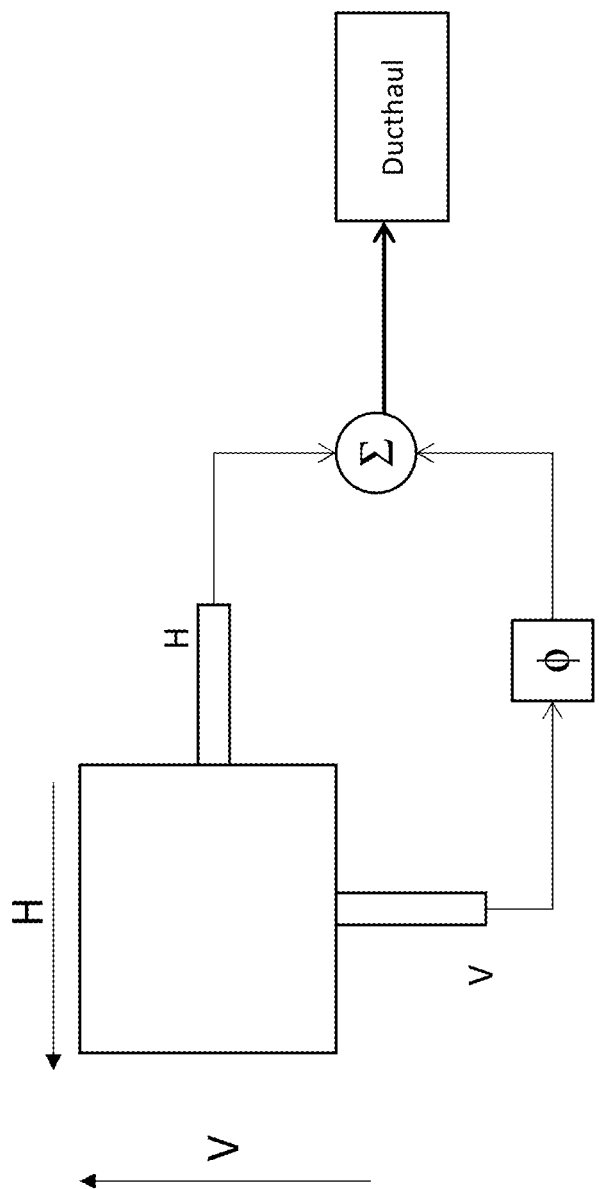
FIG. 16 schematically illustrates one of a surface mounted type of antennas in accordance with one non-limiting aspect of the present invention.

FIG. 16 schematically illustrates one of the surface mounted type of ducting antennas 80 contemplated for use in the ventilation system in accordance with one non-limiting aspect of the present invention. Some wireless systems use a linearly polarized antenna or a dual-polarized antenna to either generate circular polarization or to treat a second polarization as an independent signal (polarization diversity). Circular polarization may be unsuitable in the contemplated, ducted environment due to the rotation (right hand/left hand) flipping sign each time the signal bounces off a wall of the ducting. A dual-polarized antenna at the receiver, i.e., the next AP in the backhaul from a transmitting AP, can adjust the amplitude/phase so related signaling can combine constructively. Adjusting amplitude/phase in this manner may be differentiated from beam steering in the conventional sense and instead considered as polarization steering that in the contemplated ducted environment it can eliminate sharp multipath suck outs. The illustrated antenna may be a dual-polarization antenna that receives both horizontal (H) and vertical (V) polarizations separately. A V port signal may go through a phase shifter then added together with a H port signal with a phase shift prior to summation. The antenna may be beneficial in processing ducthaul signaling due to multiple signals with various polarizations reaching the antenna at the same time. A random instantaneous orientation of the incoming signals may periodically cause destructive interference and cancel out signaling in a manner sufficient to produce multipath interference. The antenna may be sufficient to separate signals into two orthogonal vector components such that once separated, one (or both) vector components, can be rotated so that they generally align with the other polarization, maximizing the result. Similar to adjusting the phase between the different elements in an antenna array allows to steer the direction of the main beam, adjusting the phase between orthogonal polarizations allows steering the polarization angle (for best reception).

As supported above, the present invention relates to facilitating ducthauling between APs using a ventilation system in a building to facilitate wireless communications that would otherwise be impossible or unreliable between the APs due to infrastructural constraints. The present invention is predominately described with respect to the ducthauling being performed as mmWave for exemplary non-limiting purposes as the present invention fully contemplates ducthauling at non-mmWave, e.g., at frequencies less than mmWave. One aspect of the present invention particularly contemplates facilitating ducthauling at any frequency above which the APs could otherwise wirelessly communicate with each other. In some situations, the APs may be able to communicate through the infrastructure or otherwise overcome the infrastructural restraints on wireless communications if the communications are performed at lower frequencies. The threshold at which the APs are unable to sufficiently communicate with each other through the infrastructure to provide the backhaul network may correspond with a frequency at which the contemplated ducthauling may be employed. A testing process or operation can assess frequency limitations associated with direct communications between APs given the infrastructure of the building and facilitate wireless communications above those frequencies, i.e., at the frequencies that would not permit direct communications so as to facilitate the establishment of the backhaul network through ducthauling at or above the related frequencies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for backhaul, the method comprising:
   at a first access point (AP) within a first room of a building, interfacing client data with a wide area network (WAN), the first room including a first opening to a ventilation system of the building;
   at a second AP within a second room of the building, wirelessly exchanging client data between the second AP and one or more clients of the second AP, the second AP being logically downstream of the first AP with respect to the WAN, the second room including a second opening to the ventilation system;
   wirelessly transmitting backhaul data between the first and second APs via a first antenna of the first AP located within the first opening to the ventilation system and a second antenna of the second AP located within a structure of a vent, the second antenna of the second AP having a surface area for receiving wireless signaling, the surface area being larger than a cross-sectional area of a duct of the ventilation system proximate the second antenna, the vent ornamentally concealing the second opening to the ventilation system while enabling air to flow between the ventilation system and second room via the vent, such that wireless communication signals carrying the backhaul data travel directly between the first antenna of the first AP and the second antenna of the second AP via the ventilation system;
   performing beamforming on wireless signaling to minimize destructive signaling paths within the ventilation system, the wireless signaling being communicated from the first antenna of the first AP to the second antenna of the second AP; and
   performing polarization steering on wireless signaling communicated from the first antenna of the first AP to the second antenna of the second AP, the polarization steering minimizing multipath interference at the second antenna by:
      separating the wireless signaling into at least a first orthogonal vector component and second orthogonal vector component, and
      rotating the first orthogonal vector component prior to summation with the second orthogonal vector component.

2. The method of claim 1, wherein wirelessly transmitting the backhaul data comprises using millimeter wavelength wireless signaling.

3. The method of claim 1, wherein wirelessly transmitting the backhaul data comprises using non-millimeter wavelength wireless signaling.

4. The method of claim 1, wherein wirelessly transmitting the backhaul data comprises using wireless signaling above a reliable frequency, the reliable frequency corresponding with a maximum frequency associated with reliably supporting wireless signaling between the first and second APs independently of the ventilation system.

5. The method of claim 4, further comprising performing a testing process to determine the reliable frequency, the testing process iteratively facilitating wireless signaling between the first and second APs at different frequencies until the reliable frequency is determined.

6. The method of claim 1, wherein wirelessly transmitting the backhaul data comprises using wireless signaling above a fronthaul frequency, the fronthaul frequency being a maximum frequency utilized by either one of the first and second APs to facilitate fronthaul.

7. The method of claim 6, further comprising blocking frequencies above the fronthaul frequency from entering the ventilation system using respective waveguides proximate to each of the first and second openings.

8. The method of claim 1, further comprising controlling amplitude and/or phase of wireless signaling transmitted from the first antenna of the first AP such that the wireless signaling constructively combines at the second antenna of the second AP.

9. The method of claim 1, wherein the ventilation system is capable of performing one or more of heating, ventilation, and air conditioning.

10. A method for backhaul, the method comprising:
    at a first access point (AP) within a first room of a building, interfacing client data with a wide area network (WAN), the first room including a first opening to a ventilation system of the building;
    at a second AP within a second room of the building, wirelessly exchanging client data between the second AP and one or more clients of the second AP, the second AP being logically downstream of the first AP with respect to the WAN, the second room including a second opening to the ventilation system;
    wirelessly transmitting backhaul data between the first and second APs via a first antenna of the first AP located within the first opening to the ventilation system and a second antenna of the second AP located within a structure of a vent, the second antenna of the second AP having a surface area for receiving wireless signaling, the surface area being larger than a cross-sectional area of a duct of the ventilation system proximate the second antenna, the vent ornamentally concealing the second opening to the ventilation system while enabling air to flow between the ventilation system and second room via the vent, such that wireless communication signals carrying the backhaul data travel directly between the first antenna of the first AP and the second antenna of the second AP via the ventilation system;
    determining amplitude and/or phase as part of a reflection process, the reflection process assessing reflection characteristics of ducting included within the ventilation system to communicate the wireless signaling from the first antenna to the second antenna; and
    performing polarization steering on wireless signaling communicated from the first antenna of the first AP to the second antenna of the second AP, the polarization steering minimizing multipath interference at the second antenna by:
  separating the wireless signaling into at least a first orthogonal vector component and second orthogonal vector component, and
  rotating the first orthogonal vector component prior to summation with the second orthogonal vector component.

11. The method of claim 10, wherein wirelessly transmitting the backhaul data comprises using millimeter wavelength wireless signaling.

12. The method of claim 10, wherein wirelessly transmitting the backhaul data comprises using non-millimeter wavelength wireless signaling.

13. The method of claim 10, wherein wirelessly transmitting the backhaul data comprises using wireless signaling above a fronthaul frequency, the fronthaul frequency being a maximum frequency utilized by either one of the first and second APs to facilitate fronthaul.

14. The method of claim 13, further comprising blocking frequencies above the fronthaul frequency from entering the ventilation system using respective waveguides proximate to each of the first and second openings.

15. The method of claim 10, wherein the ventilation system is capable of performing one or more of heating, ventilation, and air conditioning.

* * * * *